United States Patent
Liu et al.

(10) Patent No.: US 10,669,878 B2
(45) Date of Patent: Jun. 2, 2020

(54) OUTER AIRSEAL ABRADABLE RUB STRIP

(71) Applicant: United Technologies Corporation, Farmington, CT (US)

(72) Inventors: Xuan Liu, Glastonbury, CT (US); Christopher W. Strock, Kennebunk, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 719 days.

(21) Appl. No.: 15/465,710

(22) Filed: Mar. 22, 2017

(65) Prior Publication Data

US 2018/0230842 A1    Aug. 16, 2018

Related U.S. Application Data

(60) Provisional application No. 62/312,406, filed on Mar. 23, 2016.

(51) Int. Cl.
*F01D 11/12* (2006.01)
*C22C 9/06* (2006.01)
(Continued)

(52) U.S. Cl.
CPC .............. *F01D 11/122* (2013.01); *C22C 9/06* (2013.01); *B22F 3/1055* (2013.01); *B22F 5/04* (2013.01);
(Continued)

(58) Field of Classification Search
CPC .............. F05D 2240/11; F05D 2240/55; F05D 2300/1723; F05D 2300/2282;
(Continued)

(56) References Cited

U.S. PATENT DOCUMENTS 3,519,282 A    7/1970    Davis
3,817,719 A    6/1974    Schilke et al.
(Continued)

FOREIGN PATENT DOCUMENTS

EP    1013782 A1    6/2000
EP    2375002 A2    10/2011
(Continued)

OTHER PUBLICATIONS

U.S. Office Action dated Jul. 16, 2018 for U.S. Appl. No. 15/140,903.
(Continued)

*Primary Examiner* — Richard A Edgar
*Assistant Examiner* — Joshua R Beebe
(74) *Attorney, Agent, or Firm* — Bachman & LaPointe, P.C.

(57) ABSTRACT

A blade outer airseal has a body comprising: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer comprising a metallic matrix and a solid lubricant; and the metallic matrix comprises, by weight, 35% copper, 30.0-45.0% combined nickel, cobalt, and iron with combined iron and cobalt content at most one-third of the nickel content, 2.0-8.0% aluminum, and 5.0-15.0% chromium.

21 Claims, 3 Drawing Sheets

(51) Int. Cl.
*B22F 3/105* (2006.01)
*F01D 5/28* (2006.01)
*B22F 5/04* (2006.01)

(52) U.S. Cl.
CPC .......... *F01D 5/288* (2013.01); *F05D 2240/11* (2013.01); *F05D 2240/55* (2013.01); *F05D 2300/1723* (2013.01); *F05D 2300/2282* (2013.01); *F05D 2300/509* (2013.01); *F05D 2300/514* (2013.01); *F05D 2300/6032* (2013.01); *F05D 2300/612* (2013.01); *F05D 2300/613* (2013.01); *F05D 2300/614* (2013.01); *Y02P 10/295* (2015.11); *Y02T 50/672* (2013.01)

(58) Field of Classification Search
CPC .......... F05D 2300/509; F05D 2300/514; F05D 2300/6032; F05D 2300/612; F05D 2300/613; F05D 2300/614; F01D 11/122; F01D 5/04; F01D 5/288; F01D 11/12; Y02T 50/672; Y02P 10/295; B22F 3/1055; B22F 5/04
See application file for complete search history.

(56) References Cited

U.S. PATENT DOCUMENTS

| | | | |
|---|---|---|---|
| 3,879,831 A | 4/1975 | Rigney et al. | |
| 4,273,824 A | 6/1981 | McComas et al. | |
| 4,299,865 A | 11/1981 | Clingman et al. | |
| 4,744,725 A | 5/1988 | Matarese et al. | |
| 5,561,827 A | 10/1996 | Reeves et al. | |
| 5,780,116 A * | 7/1998 | Sileo | C23C 4/02 427/456 |
| 5,976,695 A * | 11/1999 | Hajmrle | C22C 32/0089 428/402 |
| 6,089,825 A * | 7/2000 | Walden | C23C 4/04 415/173.4 |
| 6,533,285 B2 | 3/2003 | Nava et al. | |
| 6,887,530 B2 * | 5/2005 | Fiala | B22F 3/115 427/456 |
| 6,969,231 B2 | 11/2005 | Ghasripoor et al. | |
| 7,998,604 B2 * | 8/2011 | Reynolds | C23C 4/06 428/701 |
| 8,650,753 B2 * | 2/2014 | Sellars | F01D 11/122 277/303 |
| 8,685,545 B2 * | 4/2014 | Allen | C04B 35/468 428/472 |
| 8,777,562 B2 * | 7/2014 | Strock | F01D 11/122 415/173.1 |
| 9,428,825 B1 | 8/2016 | Jablonski et al. | |
| 2004/0226636 A1 * | 11/2004 | Bampton | C22C 1/1036 148/679 |
| 2005/0155454 A1 * | 7/2005 | Fiala | B22F 3/115 75/252 |
| 2007/0205189 A1 | 9/2007 | Grossklaus, Jr. et al. | |
| 2008/0145649 A1 * | 6/2008 | Mannem | C10M 111/00 428/336 |
| 2012/0189434 A1 * | 7/2012 | Strock | F01D 5/284 415/173.4 |
| 2013/0078085 A1 | 3/2013 | Strock et al. | |
| 2016/0186595 A1 | 6/2016 | Strock et al. | |

FOREIGN PATENT DOCUMENTS

| | | |
|---|---|---|
| EP | 2444514 A1 | 4/2012 |
| EP | 2540868 A1 | 1/2013 |
| GB | 2317899 A | 4/1998 |
| WO | 95/12004 A1 | 5/1995 |
| WO | 2014/151101 A1 | 9/2014 |

OTHER PUBLICATIONS

European Search Report dated Nov. 8, 2017 for European Patent Application No. 17167927.7.
European Search Report dated Nov. 13, 2017 for European Patent Application No. 17162495.0.
European Search Report dated Oct. 8, 2019 for European Patent Application No. 19195223.3.

* cited by examiner

OUTER AIRSEAL ABRADABLE RUB STRIP

CROSS-REFERENCE TO RELATED APPLICATION

Benefit is claimed of U.S. patent application Ser. No. 62/312,406, filed Mar. 23, 2016, and entitled "Outer Airseal Abradable Rub Strip", the disclosure of which is incorporated by reference herein in its entirety as if set forth at length.

BACKGROUND

This disclosure relates to a gas turbine engine, and more particularly to gaspath leakage seals for gas turbine engines.

Gas turbine engines, such as those used to power modern commercial and military aircraft, generally include one or more compressor sections to pressurize an airflow, a combustor section for burning hydrocarbon fuel in the presence of the pressurized air, and one or more turbine sections to extract energy from the resultant combustion gases. The airflow flows along a gaspath through the gas turbine engine.

The gas turbine engine includes a plurality of rotors arranged along an axis of rotation of the gas turbine engine. The rotors are positioned in a case, with the rotors and case having designed clearances between the case and tips of rotor blades of the rotors. It is desired to maintain the clearances within a selected range during operation of the gas turbine engine as deviation from the selected range can have a negative effect on gas turbine engine performance. For each blade stage, the case typically includes an outer airseal located in the case immediately outboard (radially) of the blade tips to aid in maintaining the clearances within the selected range.

Within the compressor section(s), temperature typically progressively increases from upstream to downstream along the gaspath. Particularly, in relatively downstream stages, heating of the airseals becomes a problem. U.S. patent application Ser. No. 14/947,494, of Leslie et al., entitled "Outer Airseal for Gas Turbine Engine", and filed Nov. 20, 2015 ('494 application), the disclosure of which is incorporated by reference in its entirety herein as if set forth at length, discusses several problems associated with heat transfer to outer airseals and several solutions.

The airseal typically has an abradable coating along its inner diameter (ID) surface. In relatively downstream stages of the compressor where the blades have nickel-based superalloy substrates, the abradable coating material may be applied to a bondcoat along the metallic substrate of the outer airseal. For relatively upstream sections where the compressor blades comprise titanium-based substrates (a potential source of fire) systems have been proposed with a fire-resistant thermal barrier layer intervening between the bondcoat and the abradable material. An example of such a coating is found in U.S. Pat. No. 8,777,562 of Strock et al., issued Jul. 15, 2014 and entitled "Blade Air Seal with Integral Barrier".

SUMMARY

One aspect of the disclosure involves a blade outer airseal having a body. The body comprises: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer comprising a metallic matrix and a solid lubricant; and the metallic matrix comprises, by weight, ≥35% copper, 30.0-45.0% combined nickel, cobalt, and iron with combined iron and cobalt content at most one-third of the nickel content, 2.0-8.0% aluminum, and 5.0-15.0% chromium.

A further embodiment may additionally and/or alternatively include the combined cobalt and iron contents of the metallic matrix being less than 5% by weight.

A further embodiment may additionally and/or alternatively include, at 1200° F. the metallic matrix having: at least 98% by volume fcc and L12 phases combined with at least 10% L12.

A further embodiment may additionally and/or alternatively include the metallic matrix further comprising, by weight: no more than 5.0% combined of all other elements; and no more than 1.5% of any individual other element.

A further embodiment may additionally and/or alternatively include the metallic matrix further comprising, by weight: no more than 0.5% combined of niobium, molybdenum, tantalum, tungsten, and rhenium.

A further embodiment may additionally and/or alternatively include the metallic matrix further comprising, by weight: ≤1.0% hafnium; ≤1.0% silicon; and ≤1.0% yttrium.

A further embodiment may additionally and/or alternatively include over the first area of the inner diameter surface, the coating system comprising the abradable layer and a thermal barrier layer between the abradable layer and the substrate.

A further embodiment may additionally and/or alternatively include the abradable layer having a volume content of said solid lubricant of 5.0% to 80%.

A further embodiment may additionally and/or alternatively include the solid lubricant comprising HBN.

A further embodiment may additionally and/or alternatively include the abradable layer having a volume content of said metallic matrix of 20% to 50%.

A further embodiment may additionally and/or alternatively include the abradable layer having less than 20% porosity.

A further embodiment may additionally and/or alternatively include one or more of: the coating system having a bondcoat between the abradable layer and the substrate; and the substrate being a nickel-based superalloy.

Another aspect of the disclosure involves a method for manufacturing the blade outer airseal, the method comprising: thermal spray of the abradable layer.

Another aspect of the disclosure involves a method for using the blade outer airseal, the method comprising: installing the blade outer airseal on a turbine engine; and running the turbine engine so that blade tips rub the abradable coating.

Another aspect of the disclosure involves a blade outer airseal having a body. The body comprises: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer comprising a metallic matrix and a solid lubricant; and the metallic matrix comprises, by weight ≥80% copper, ≤10.0% nickel, 3.0-9.5% aluminum, and 3.0-10.0% chromium.

A further embodiment may additionally and/or alternatively include at 1200° F. the metallic matrix having by volume: at least 88% fcc phase; and 1% to 10% bcc (A2) phase.

A further embodiment may additionally and/or alternatively include the metallic matrix further comprising, by weight: no more than 5.0% combined of all other elements; and no more than 1.5% of any individual other element.

A further embodiment may additionally and/or alternatively include the metallic matrix further comprising, by weight: no more than 0.5% combined of niobium, molybdenum, tantalum, tungsten, and rhenium.

A further embodiment may additionally and/or alternatively include the metallic matrix further comprising, by weight: ≤1.0% hafnium; ≤1.0% silicon; and ≤1.0% yttrium.

Another aspect of the disclosure involves a blade outer airseal having a body. The body comprises: an inner diameter (ID) surface; an outer diameter (OD) surface; a leading end; and a trailing end. The airseal body has a metallic substrate and a coating system atop the substrate along at least a portion of the inner diameter surface. At least over a first area of the inner diameter surface, the coating system comprises an abradable layer comprising a metallic matrix and a solid lubricant; and at 1200° F. the metallic matrix has: at least 40% by volume primary fcc; at least 10% by volume gamma prime (L12), bcc (A2), and/or secondary fcc (A1) crystal structure; and at most 10% by volume beta (B2) crystal structure.

A further embodiment may additionally and/or alternatively include a gas turbine engine compressor section comprising: a stage of blades having Ni-based substrates; and the blade outer airseal wherein the inner diameter (ID) surface faces tips of the blades.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
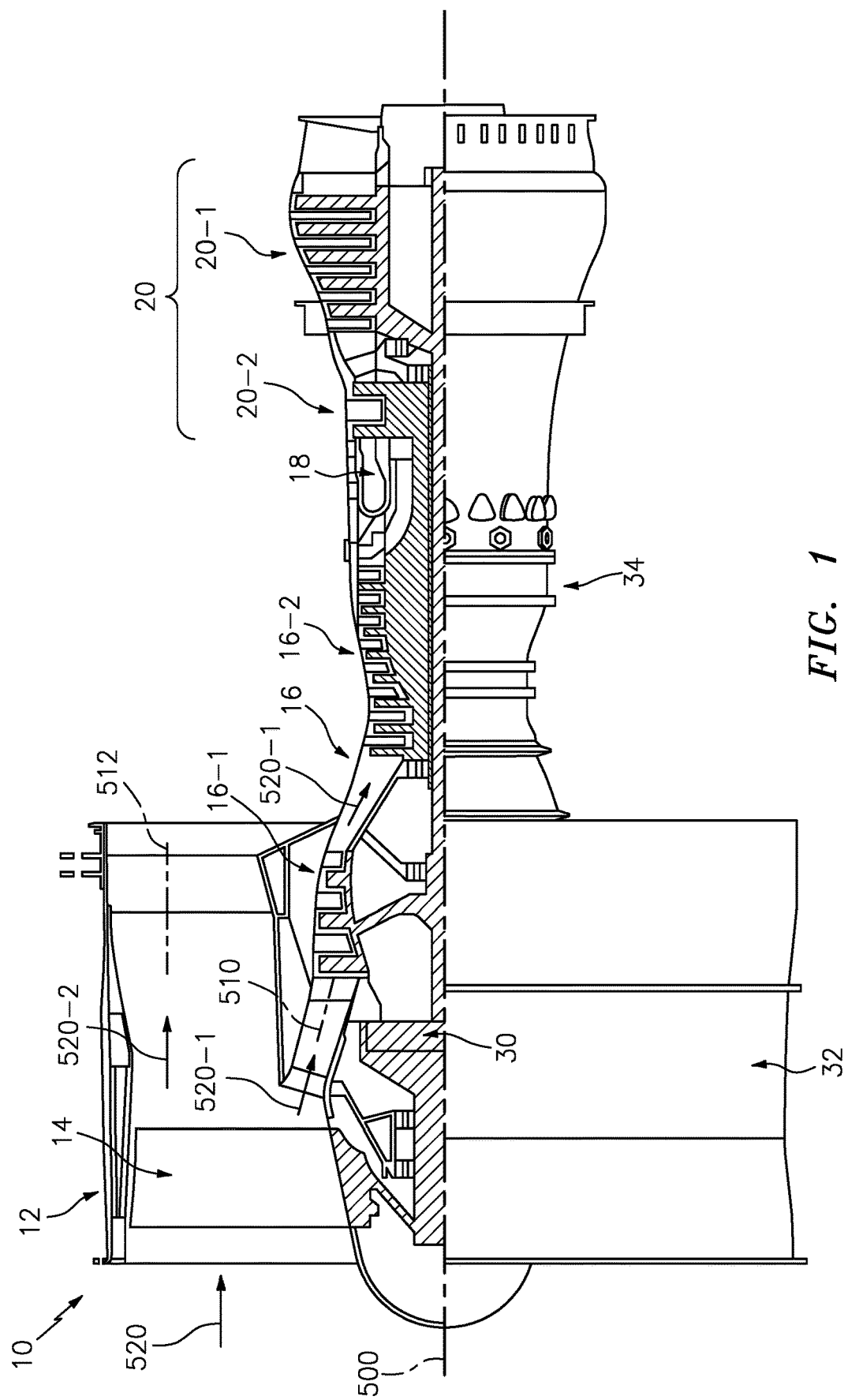
FIG. 1 is a schematic axial half cross-sectional view of an embodiment of a gas turbine engine.

FIG. 1 is a schematic illustration of a gas turbine engine 10. The illustrated engine is a turbofan used to produce propulsive thrust in aerospace applications. Broadly, relevant gas turbine engines may also include turbojets, turboprops, industrial gas turbines (IGT), and the like. For purposes of illustration, outer aerodynamic cases are not shown. The gas turbine engine has a central longitudinal axis 500. The gas turbine engine generally has a fan section 12 through which an inlet flow 520 of ambient air is propelled by a fan 14, a compressor 16 for pressurizing the air 520-1 received from the fan 14, and a combustor 18 wherein the compressed air is mixed with fuel and ignited for generating combustion gases. The inlet flow 520 splits into a first or core portion 520-1 flowing along the gaspath (core flowpath) 510 and a bypass portion 520-2 flowing along a bypass flowpath 512. The illustrated engine 10 and gross features of its airseals (discussed below) are based on a particular configuration shown in the aforementioned '494 application.

Nevertheless, the teachings herein may be applied to other general engine configurations and other general airseal configurations.

The gas turbine engine 10 further comprises a turbine 20 for extracting energy from the combustion gases. Fuel is injected into the combustor 18 of the gas turbine engine 10 for mixing with the compressed air from the compressor 16 and ignition of the resultant mixture. The fan 14, compressor 16, combustor 18, and turbine 20 are typically all concentric about a common central longitudinal axis 500 of the gas turbine engine 10.

Depending upon the implementation, the compressor and turbine may each contain multiple sections. Each section includes one or more stages of rotor blades interspersed with one or more stages of stator vanes. The exemplary configuration has two compressor sections and two turbine sections. From upstream to downstream along the gaspath 510, these include a low pressure compressor section (LPC) 16-1, a high pressure compressor section (HPC) 16-2, a high pressure turbine section (HPT) 20-2, and a low pressure turbine section (LPT) 20-1. The exemplary rotors of the LPC and LPT are formed to rotate as a first unit or low pressure spool with the LPT driving the LPC. Similarly, the HPT and HPC rotors are arranged as a high pressure spool. The fan may be driven by the low pressure spool either directly or via a reduction gearbox 30. Other configurations are, however, known. Whereas illustrated in the context of compressors 16, one skilled in the art will readily appreciate that the present disclosure may be utilized with respect to turbines (e.g., an LPT where temperatures are relatively low).

Figure 2:
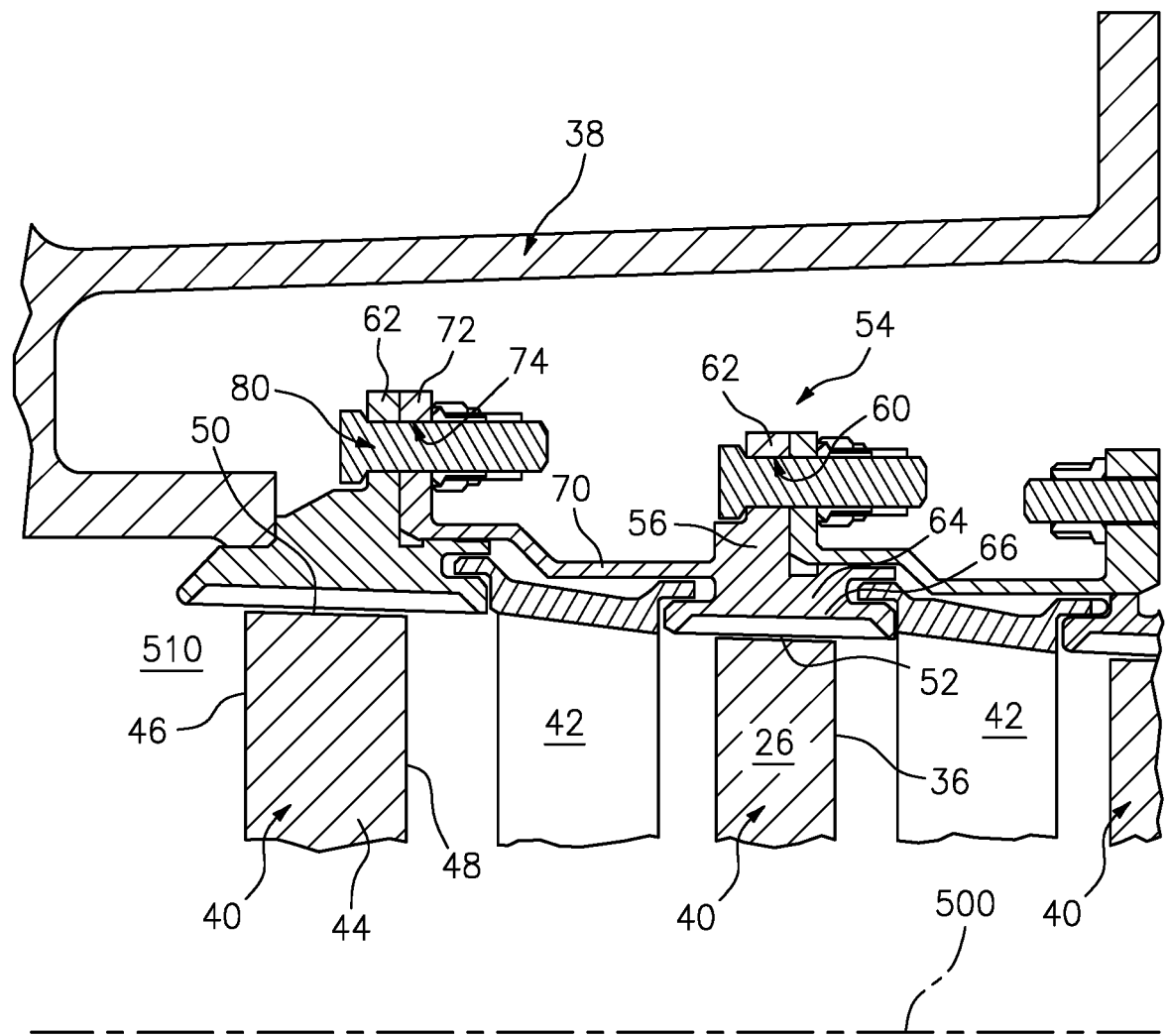
FIG. 2 is a schematic axial cross-sectional view of an embodiment of a compressor of the gas turbine engine.

The exemplary engine comprises a fan case 32 and a core case 34. The core case has sections along the corresponding sections of the engine core. FIG. 2 shows an HPC case section 38 of the core case 34 along the HPC.

FIG. 2 schematically shows several stages of blades 40 of the HPC rotor. Interspersed with the blades are stages of stator vanes 42. Each blade has an airfoil 44 having a leading edge 46, a trailing edge 48, a pressure side (not shown) and a suction side (not shown) and extends from an inboard end to an outboard tip 50. The tip 50 is in close facing proximity to an inner diameter (ID) surface 52 of an outer airseal 54. Each exemplary outer airseal 54 includes a metallic substrate 56 and an abradable coating system (or rub strip) 58 (FIG. 2A) forming the ID surface 52 along an ID surface of the substrate.

The exemplary outer airseal 54 is formed as a generally full annulus (e.g., locally interrupted by mounting features such as a circumferential array of holes 60 in a radially outwardly extending flange 62). In cross-section, the exemplary outer airseals 54 comprise an inboard body or band 64 comprising a body or band 66 of the substrate and the rub strip 58 inboard thereof. The flange 62 extends radially outward from the band 66. For mounting the exemplary airseals, at a forward end of the flange 62, an axial collar portion 70 extends forwardly to terminate in a radially outward extending flange 72. The flange 72 has mounting holes 74 complementary to mounting holes of an adjacent mating flange. FIG. 2 shows several airseal stages associated with respective blade stages. Each flange 72 may mate to a flange 62 of the next forward airseal and be secured thereto via fasteners (e.g., threaded fasteners) 80.

Figure 2A:
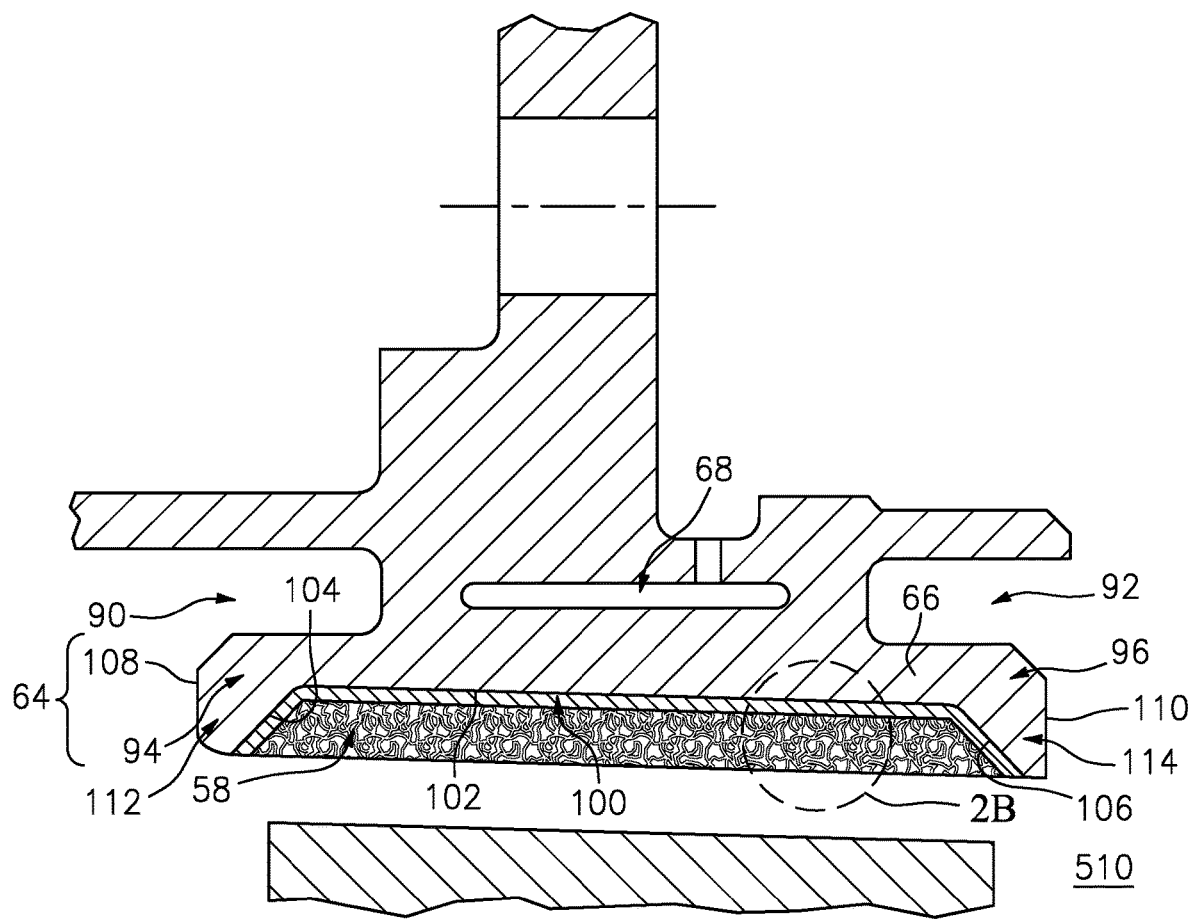
FIG. 2A is a schematic axial cross-sectional view of an embodiment of an outer airseal of the compressor of the a gas turbine engine at detail 2A of FIG. 2.

FIG. 2A further shows respective fore and aft channels 90 and 92 outboard of corresponding cantilevered portions 94 and 96 of the substrate band 66 for capturing associated flanges of adjacent stages of stator segments.

As is discussed in aforementioned '494 application, heat transfer to the flanges 62 and 72 is a source of problems.

Steps that have been undertaken to address this include: making the flange 62 appropriately massive; and adding cooling features 68 such as those in the '494 application. The massiveness of the flange 62 functions in several ways. First, for a given amount of heat transfer to the band 66, and thus from the band to the flange 62, the temperature increase experienced by the flange will be smaller for more massive flanges. Second, a more massive flange 62 can more easily mechanically resist expansion caused by heating of the band 66 due to greater strength of the more massive flange.

As is discussed below, however, the rub strip 58 may be configured to influence heat transfer from the gaspath 510 ultimately to the flange 62. In various implementations, use of the rub strip to assist in thermal management may allow reduced massiveness of the flange and/or may allow reduction or elimination of cooling features such as those shown in the '494 application. Nevertheless, the thermal management associated with the rub strip 58 may be used in conjunction with such other features.

The exemplary rub strip 58 (FIG. 2A) is located in an inwardly (radially) open annular channel 100 or well in the substrate band portion 66. The channel has a surface comprising a base surface 102 and respective fore and aft surfaces 104 and 106.

The band 66 extends from a forward rim 108 to an aft rim 110 and has forwardmost and aftmost portions 112 and 114 respectively forward of and behind the channel 100.

Figure 2B:
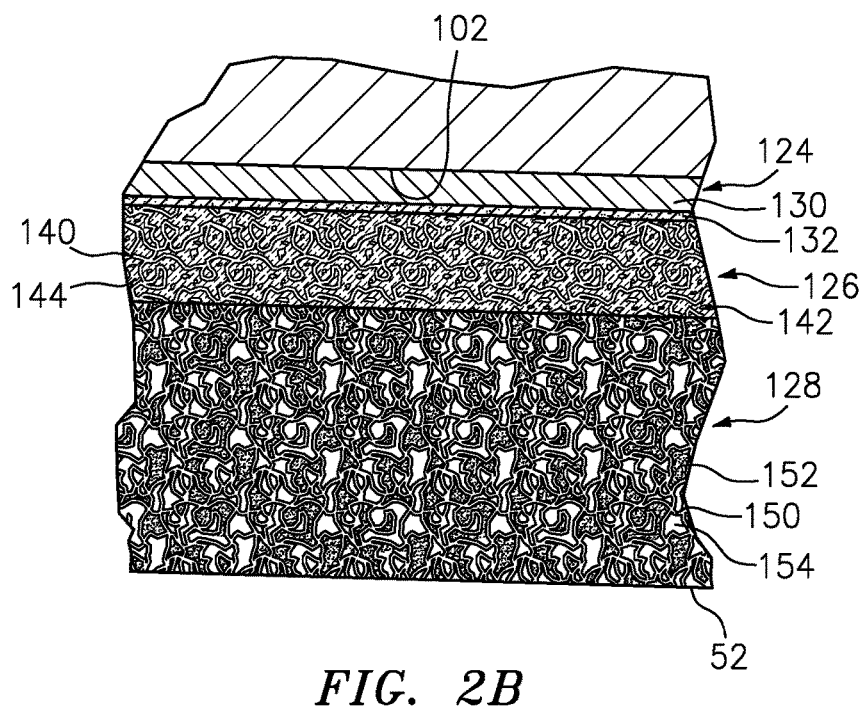
FIG. 2B is a coating cross section at detail 2B of FIG. 2A.

The rub strip 58 may be formed with multiple layers. A base layer 124 (FIG. 2B) may be a bondcoat atop an inner diameter (ID) surface portion of the substrate band formed by the channel surfaces (102, 104, 106). An optional thermal barrier coating (TBC) layer 126 is at least locally atop the bondcoat. An abradable layer 128 is at least locally atop the TBC layer (or atop the bondcoat if no TBC layer or otherwise positioned). The abradable layer 128 may represent modification of any appropriate prior art or future abradable layer composition but featuring matrix alloy discussed below. The TBC layer 126, if present, may be selected for insulative purposes to limit or tailor the flow of heat from the gaspath 510 to the substrate 56.

The exemplary bondcoat 124 includes a base layer 130 and a thermally grown oxide (TGO) layer 132. The base layer and TGO layer may originally be deposited as a single precursor layer. There may be diffusion with the substrate. The TGO layer may reflect oxidation of original material of the precursor. Exemplary base layer thicknesses are 10-400 micrometers, more narrowly 20-200 micrometers. Exemplary TGO layer thicknesses are 0.05-1 micrometers, more narrowly 0.1-0.5 micrometers. Alternative bondcoats include diffusion aluminides.

An exemplary coating process includes preparing the substrate (e.g., by cleaning and surface treating). A precursor of the bondcoat is applied. An exemplary application is of an MCrAlY, more particularly a NiCoCrAlY material. An exemplary MCrAlY is Ni 23Co 17Cr 12Al 0.5Y. An exemplary application is via a spray (e.g., a thermal spray) from a powder source. Exemplary application is via air plasma spray (APS). Alternative methods include a high-velocity oxy-fuel (HVOF) process, a high-velocity air-fuel (HVAF) process, a low pressure plasma spray (LPPS) process, or a wire-arc process.

An exemplary application is to a thickness of 0.003-0.010 inch, (76-254 micrometers) more broadly 0.001-0.015 inch (25-381 micrometers).

After the application, the precursor may be diffused. An exemplary diffusion is via heating (e.g., to at least 1900° F. (1038° C.) for a duration of at least 4 hours) in vacuum or nonreactive (e.g., argon) atmosphere. The exemplary diffusion may create a metallurgical bond between the bondcoat and the substrate. Alternatively diffusion steps may occur after applying the TBC, if at all.

After application of the bondcoat precursor, if any, the substrate may be transferred to a coating apparatus for applying the TBC 126, if any, and abradable layer 128. An exemplary application is via a spray (e.g., a thermal spray) from a powder source. Exemplary application is via air plasma spray (APS). Alternative methods include a high-velocity oxy-fuel (HVOF) process, a high-velocity air-fuel (HVOF) process, a low pressure plasma spray (LPPS) process, or a wire-arc process. Alternative techniques involve consolidated and sintered powder including pressing, tape casting, and vibratory consolidation. These may include direct write, DMLS and laser fusing 3D printing with or without binders. As an alternative to in situ formation directly on the substrate (optionally with a bond coat or other layer(s)) pre-formed layers may be brazed or adhesively bonded or otherwise to the substrate (or to an intervening layer).

An exemplary TBC 126 comprises a single ceramic-containing layer of a single nominal composition. Multi-layer and graded composition embodiments are also possible. An exemplary abradable layer 128 is a metal matrix composite. An exemplary metal matrix composite comprises the metal (alloy) matrix, a solid lubricant, and porosity.

The exemplary TBC 126 contains metal (alloy) 140 and porosity 142 in addition to the ceramic 144. The exemplary by volume content of metal in the TBC is less than in the abradable layer.

Within the TBC 126, an exemplary ratio of ceramic 144 to metal 140 by volume is between 3:1 and 50:1, more particularly between 5:1 and 20:1 or between 5:1 and 10:1 or an exemplary about 7:1. An exemplary remainder (e.g., porosity plus solid lubricant in some embodiments as discussed below) is up to 70% by volume, more particularly 2% to 70%, or 5% to 60% or 20% to 50% or 30% to 45% or an exemplary about 40%.

The ceramic 144 (e.g., a stabilized zirconia such as a yttria-stabilized zirconia (YSZ), particularly 7YSZ) contributes to the composite low conductivity and strength. The metal 140 greatly increases toughness and spallation resistance. Porosity (if any) created inherently by the application (e.g., spray) process and/or via addition of a fugitive filler material further reduces conductivity, but also contributes to reduced elastic modulus, coating stress and tendency to spall (i.e., both the metallic content and porosity increase the possible thickness of the TBC 126 and therefore maximum thermal resistance of the system). At some point with increasing porosity the TBC gets weak and allows abradable spallation. To mitigate this, the TBC may be selected to be stronger than the abradable.

The exemplary abradable layer 128 contains metal (alloy) 150 and a solid lubricant 152. It may further contain porosity 154.

A very broad range of relative contents of solid lubricant and porosity are possible in the abradable layer 128. Within the abradable layer 128, an exemplary by volume content of the metal is 20% to 50%, more particularly 25% to 40%, or an exemplary about 35%. An exemplary porosity is up to 70% by volume, more particularly 1.0% to 70%, or 1.0% to 40%, or 1.0% to 30%; or 10% to 30% or 15% to 30% or an exemplary about 20% in embodiments that have significant porosity. Other embodiments may target low porosity (e.g., 0% to 10% or 1% to 6% or 2% to 4%) with high solid lubricant content. Exemplary solid lubricant 152 volumetric contents are at least 5% or at least 20% or an exemplary 20% to 60% in higher porosity layers and 60% to 80% or 70% to 80% or 75% to 80% in the low porosity embodiments.

In the low porosity abradable layer embodiments, porosity may be lower in the abradable layer than in the TBC (substantially lower in embodiments where the TBC or a main portion thereof does not include any of the solid lubricant but has only the ceramic, metal, and porosity). In either situation, the abradable layer would have lower cohesive bond strength than the TBC. In embodiments where the cohesive strength of the abradable layer is equal to or higher than that of the TBC, the risk of sheet spallation from the TBC would be unacceptable.

Exemplary solid lubricants include hexagonal boron nitride (hBN) (e.g., commercially pure hBN or a mixture such as 10 wt % bentonite agglomerated hBN). The selection of porosity to hBN ratio may involve both engine operational requirements and economics. HBN is relatively expensive compared with porosity formers. Whereas high porosity coating versions will be lower cost to produce, the resultant roughness and porosity of the coating may cause greater aerodynamic losses than those with relatively lower porosity and higher hBN content. In order to improve the economics of low porosity, high hBN coatings, a binder material such as bentonite may be used to improve the deposition efficiency of the hBN.

In many aerospace applications the benefit of improved aerodynamic efficiency greatly outweighs the added manufacturing cost of using high hBN content as opposed to porosity formers. For example, the erosion resistance and abradability of a coating containing 28% by volume metal matrix may be desirable for a given application. If the coating were made with hBN content of about 70% and porosity of about 2%, the resultant coating would have low gas permeability and low surface roughness compared with a similar coating of high porosity. That high porosity coating would for example be 28% metal matrix plus 72% porosity after a fugitive constituent such as methylmethacrylate is burned out. A turbine compressor stage with the high hBN, relatively dense coating, would have about 1% greater compressor stage efficiency than the porous version. This 1% efficiency difference provides thousands of dollars' worth of fuel savings over the life of an engine. In contrast, the added manufacturing cost may be on the order of a few hundred dollars. In contrast, in the land based industrial gas turbine (IGT) industry, turbine diameter is relatively large. As diameter increases, power increases faster as a function of diameter increase than do the surface roughness aerodynamic losses around the outer diameter of the turbine. Thus, the efficiency of the larger diameter IGT turbines is less sensitive to the surface aerodynamic losses. With the high emphasis on low initial cost in the IGT industry, the less expensive high porosity version of the abradable is likely to be chosen.

Even in the high porosity coating versions it is desirable to include at least some solid lubricant phase, on the order of 5% by volume. The solid lubricant contributes to particle liberation during rub events. In contrast, with no solid lubricant, there is an increased tendency for metal smearing that creates a fully dense metal layer on the abradable. When this occurs, blade wear increases and abradability is diminished.

In comparison with fused and crushed pure hBN, hBN agglomerated with bentonite binder is used more efficiently in the thermal spray process. The pure hBN material is fused and crushed with irregular particle shape. The pure material also does not have a melting point under atmospheric conditions. This means that not only is the powder difficult to feed uniformly to the plasma spray process, but it does not melt to facilitate adhesion and deposition in the form of a coating. With the addition of bentonite to hBN (5% to 15% of the hBN weight), a slurry of the mixture can be made that can be spray dried into agglomerates that are substantially round and well suited to the powder feed methods used in thermal spray. These agglomerates may be further heat treated to calcine the bentonite to drive off the water portion of the hydrated molecules that makeup the bentonite. This thermal treatment helps to make the agglomerates more durable to handling and reduces gas evolution during the heating of the thermal spray process. During the thermal spray process, most desirably air plasma spray, the bentonite component of the agglomerates melts and facilitates adhesion to form the coating. The resultant deposition process for the agglomerated hBN is about three times as efficient as for the pure crushed hBN.

An exemplary ratio of abradable layer volumetric metal content to TBC volumetric metal content is between 1.5:1 and 15:1, more particularly between 2:1 and 10:1, or an exemplary 5:1. In one group of examples, the metal (alloy) of the TBC is the same as that of the abradable. An exemplary alloy family is Cu—Ni—Cr—Al alloys. A particular alloy Cu40Ni7Cr7Al. Use of the same alloy across both layers has advantages of minimizing chances for galvanic corrosion and limiting differential thermal expansion and may otherwise aid inter-layer adhesion. Alternatives involve MCrAlY alloys.

In another group of examples, the metal (alloy) of the TBC is the same as that of the bondcoat (optionally different from that of the abradable layer). Similar advantages attend this as having the same alloy across the TBC and abradable layers.

The aforementioned Cu40Ni7Cr7Al is one of several alloys believed to have advantageous properties for use in at least the abradable layer 128. Table I below lists several variations on this alloy among other candidates. The percentages are overall percentages in the deposited matrix and overall percentages in source material. When phases form in the deposited matrix, there will be variations in composition between the different phases.

TABLE I

| | Matrix Alloys (weight percentages) | | | | | | | |
|---|---|---|---|---|---|---|---|---|
| | Element | | | | | | | |
| | Cu | Ni | Al | Cr | Hf | Si | Y | Al + Cr |
| Ex. 1 | Bal. | 40 | 7 | 7 | | | | |
| Ex. 2 | Bal. | 40 | 7 | 7 | 0.5 | 0.25 | 0.8 | |
| Ex. 3 | Bal. | 40 | 4 | 6.5 | 0.5 | 0.25 | 0.8 | |

TABLE I-continued

Matrix Alloys (weight percentages)

| | Element | | | | | | | |
|---|---|---|---|---|---|---|---|---|
| | Cu | Ni | Al | Cr | Hf | Si | Y | Al + Cr |
| Ex. 4 | Bal. | 25 | 9 | 4 | | | | |
| Ex. 5 | Bal. | 0 | 7 | 7 | | | | |
| Range 1 | Bal. | 30.0-45.0 | 2.0-8.0 | 5.0-15.0 | ≤1.0 | ≤1.0 | ≤1.5 | 8.0-20.0 |
| Range 2 | Bal. | 35.0-43.0 | 3.0-8.0 | 5.0-9.0 | ≤1.0 | ≤1.0 | ≤1.5 | 10.0-16.0 |
| Range 3 | Bal. | 38.0-42.0 | 3.5-7.5 | 6.0-8.0 | ≤1.0 | ≤1.0 | ≤1.5 | 10.0-15.0 |
| Range 4 | Bal. | 35.0-42.0 | 3.5-5.0 | 6.0-7.0 | ≤1.0 | ≤1.0 | ≤1.5 | 10.0-12.0 |
| Range 5 | Bal. | ≤10.0 | 3.0-9.5 | 3.0-10.0 | ≤1.0 | ≤1.0 | ≤1.5 | 9.0-16.0 |
| Range 6 | Bal. | ≤5.0 | 3.0-8.0 | 3-10 | ≤1.0 | ≤1.0 | ≤1.5 | 9.0-16.0 |
| Range 7 | Bal. | ≤5.0 | 5.0-8.0 | 5.0-9.0 | ≤1.0 | ≤1.0 | ≤1.5 | 9.0-16.0 |
| Range 8 | Bal. | ≤3.0 | 5.0-8.0 | 5.0-9.0 | ≤1.0 | ≤1.0 | ≤1.5 | 9.0-14.0 |

Composition and processing parameters may be selected so that at 1200° F. (649° C.) the alloy has at least 10% by volume gamma prime (L12), bcc (alpha-Cr) (A2), and/or secondary fcc (A1) crystal structure and at most 10% by volume beta (B2) crystal structure. The primary phase will be fcc at a content of at least 50% by volume and typically close to the remainder. For example, the primary fcc combined with the other listed phases may account for at least 98.0% by volume or at least 99.0%. Miscellaneous material including oxides may account for the rest.

The ductility of the fcc phase (vs. hardness of B2) is advantageous when interfacing with a blade lacking an abrasive tip (i.e. the abradable coating interfaces directly with blade substrate superalloy). An exemplary nickel-based blade superalloy substrate is IN718.

With traditional CoNiCrAlY abradables, during the rub event, the hard B2 phase can wear the IN718 blade material and cause damage. The more ductile L12 intermetallic phase embedded in a soft Cu-fcc matrix is advantageous for interfacing with the blade substrate. These phases are similar to those present in the blade superalloy but are mechanically weaker to prevent damage to the blade material.

In one or more embodiments, advantageous features of these alloys are: they are ductile and tough to resist erosion and cracking in the operating temperature range; they have lower yield strength than blade substrate (e.g., IN718) at all operating temperatures; their strengths go to zero at their melting points well before the blade substrate; there are little to no phase changes over the operating temperature range to cause thermal cycle induced failure; they have good corrosion and oxidation resistance at operating temperature to protect the alloy itself.

Exemplary matrix compositions have ductile multi-phase structure up to the onset of melting at about 1030-1040° C. This is about 300° C. below the melting point of the blade substrate material (e.g., about 1300° C.)

At one exemplary rub temperature of 1200° F., IN718 in one exemplary forged and aged condition has a yield strength (0.2% offset) of 132.5 ksi (914 MPa) and an ultimate tensile strength (UTS) of 150.0 ksi (1034 MPa). To interface with such a substrate, exemplary alloys might have a yield strength no more than 60 ksi (414 MPa) and a UTS of no more than 80 ksi (552 MPa) at said temperature, both being substantially lower than those of the substrate (e.g., more than 30% lower with some being at least 50% lower).

In addition to melting point below that of the blade substrate, the matrix alloy should not form an excess of intermetallic compounds which will reduce ductility and durability.

The material may be particularly useful in addressing blade wear in relatively downstream stages of an HPC without adding abrasive blade tips while achieving good abradability and erosion resistance. The high temperature softness represents a substantial deviation from prior CoNiCrAlY abradable matrix that relied on weak interparticle bonding to achieve abradability.

The table shows four nominal examples: Cu40Ni7Al7Cr; Cu40Ni4Al6.5Cr; Cu25Ni9Al4Cr; and Cu7Al7Cr. The first two are species of a high nickel content alloy; the third is an example of an intermediate nickel alloy; the fourth is an example of a low or no nickel alloy. As is discussed below, of these three, the high nickel alloy and low nickel alloy are believed advantageous in abradable applications.

The table also shows a species of the first having specific amounts of Hf, Si and Y.

The table shows several ranges around each of these three basic alloys. Ce, La, and Zr may also substitute for the Hf, Si, and/or Y. These six elements can add additional oxidation resistance, but must be limited to prevent excessive formation of intermetallic compounds that will harden and make the material more brittle. In some embodiments, these six elements may aggregate to ≤3.5 weight % or ≤3.0 weight % or ≤2.5 weight % or ≤2.0 weight %.

The table also shows several ranges around combinations and subcombinations of the three basic alloys.

For each of these basic alloys or ranges, further variations may include limits on Nb+Mo+Ta+W+Re (e.g., ≤0.5) and/or elements other than those listed (e.g., also ≤0.5).

Properties of the specific examples and families are discussed below. Cu-40Ni-7Al-7Cr (nominal weight %) is derived to be a two-phase ductile alloy with very little or no third phase present. The two phases present are ductile fcc (disordered crystal structure) and L12 phases (ordered crystal structure). In atomic percent, the center of the composition range of this alloy (ignoring impurities and additions) is Cu-37.9Ni—14.4Al—7.5Cr (atomic %). Having an Al+Cr content in excess of 20 atomic % guarantees that a stable adherent aluminia/chromia protective oxide layer forms when the alloy is exposed to temperatures in excess of 1200° F. in an oxygen-rich environment such as a turbine engine compressor. Lower atomic percentages will still be effective (e.g., at least about 15%). For example, the nominal Cu40Ni4Al6.5Cr has atomic % Al+Cr of about 16%.

Cu-40Ni-7Al-7Cr and key alloys near it in the ranges above will have a high volume percent (more than 30%) of a ductile second strengthening phase (L12) in a ductile matrix (fcc). The high Ni content provides additional strength and stabilizes the L12 phase.

Cu-40Ni-7Al-7Cr (in weight %) is one composition actually produced and believed to be at or close to the upper Al and Cr limits of a particular range. A more ideal alloy in this range is Cu-40Ni-4Al-6.5Cr (in weight %). This is believed more remote from compositions that would develop undesirable embrittling phases such as B2. Within the range of 30-45 Ni (in weight %), 2.0-8.0 Al, 5.0-15.0 Cr and balance Cu, the alloy should have two major phases present (with little or no third phase): ductile fcc (disordered crystal structure) and L12 phases (ordered crystal structure).

It may be possible to substitute in a moderate amount of cobalt for some of the nickel. In general, these have certain similarities in affecting phase stabilities. Beyond some threshold, differences between cobalt and nickel may become relevant with cobalt tending to stabilize undesirable phases. Thus, an exemplary substitution threshold is replacing up to 25% of the nickel or up to 10% as a lower threshold. Similarly, there may be an iron substitution. Thus, the 25% and 10% examples may be applied to the combined iron and cobalt (even though behavior may be slightly more sensitive to iron content).

Cu-25Ni-9Al-4Cr (nominal weight %) is derived to be a two-phase alloy with poorer ductility than Cu-40Ni-7Al-7Cr. In atomic percent, the center of the composition range of this alloy (ignoring impurities and additions) is Cu-23.5Ni-18.4Al-4.2Cr (atomic %). The high amount of Al and low amount of Ni can precipitate hard beta (B2) phase which can give it more brittle behavior. Desirable behavior would thus be obtained with lower Al and/or higher Ni. This alloy was produced to verify the predicted relatively poor behavior. This alloy is believed to have a relatively high volume percent (more than 30%) of a brittle strengthening phase (B2) in a ductile matrix (fcc). A lower Ni content than the first example lowers overall strength of alloy and stabilizes the B2 phase. This also relates to the greater upside tolerance of the first example to Cr vs. Al (the Al tending more to stabilize B2 at both given weight and atomic percent).

The Cu-7Al-7Cr (nominal weight %) is derived to be a two-phase ductile alloy with very little or no third phase present. In atomic percent, the alloy is Cu-14.9Al-7.7Cr (atomic %). The two phases present are ductile fcc (disordered crystal structure) and less ductile bcc-A2 phases (disordered crystal structure). Having an Al+Cr content in excess of 20 atomic % guarantees that a stable adherent aluminia/chromia protective oxide layer forms as above.

Some embodiments may be characterized as having low volume percent (at 1200° F. less than 15% or 5.0% to 10.0%) of the strengthening phase (bcc-A2) in a ductile matrix (fcc). The relative absence of Ni stabilizes the strengthening bcc-A2 phase. The embrittling B2 phase is believed avoided with either very low Ni or relatively high Ni contents.

The specific Cu-7Al-7Cr composition is another desired composition representing the upper limits (Al and Cr combined) of a particular range. Within the range of 2.0-9.0 Al (weight %), 5.0-15.0 Cr, and balance Cu, the alloy should have two phases present (with little or no third phase): large amounts of ductile fcc (disordered crystal structure) and small amounts of bcc-A2 phases (disordered crystal structure).

In the various alloys, there may be additions of Hf, Si, and/or Y (or the Ce, La, and/or Zr noted above and subject to similar limits). Hf, Si, and Y are highly reactive elements (RE) in the presence of oxygen and aid in the formation of an adherent protective oxide scale (the aforementioned alumina-chromia) during high temperature oxidation. Additionally, these reactive elements slow down the growth kinetics of the oxides which prevents excessive oxide growth. Excessive oxide growth can be detrimental to rub behavior. However, Hf, Si, and Y contents must be kept below about one weight % each or excessive growth of hafnium-oxide, silicon-oxide and yttrium-oxide can occur. Such growth competes with the alumina and chromia. The RE oxides have needle-like morphology and thus do not provide the protective barrier function of alumina and chromia.

Additions of refractory elements can precipitate other brittle phases which are detrimental to rub behavior. Thus, as noted above, the alloys in the table above may be further defined by a combined Nb+Mo+Ta+W+Re content of less than or equal to 0.50 weight percent.

An exemplary application process involves a thermal spray process (e.g., air plasma spray) in a single spray chamber to apply the TBC 126 and abradable layer 128. In one group of examples: a first premixed powder contains powders of the metal 140, ceramic 144, and a fugitive (e.g., polymeric such as an aromatic crystalline polyester or methyl methacrylate); and a second premixed powder contains powders of the metal 150, solid lubricant 154, and a fugitive (e.g., polymeric such as an aromatic crystalline polyester or methyl methacrylate). The spray torch may be switched between sources of the first powder and second powder to sequentially apply the TBC 126 and abradable layer 128. Post-spray bakeout may remove the fugitive to leave the porosity 142 and 154.

An exemplary thickness of the TBC 126 is 0.010 inch to 0.080 inch (0.25 millimeter to 2.0 millimeter), more particularly, 0.020 inch to 0.060 inch (0.51 millimeter to 1.5 millimeter). An exemplary thickness of the abradable layer 128 is 0.010 inch (0.25 millimeter) to 0.16 inch (4.1 millimeters) or 0.020 inch (0.51 millimeter) to 0.10 inch (2.5 millimeters) or about 0.040 inch (1.0 millimeter) to 0.080 inch (2.0 millimeters). Depthwise transition zones may be present. For example, there may be a brief interval in a spray process when both the first powder source and second powder source are active. In situations without the TBC layer 126, exemplary abradable thickness is 0.030 inch (0.76 millimeter) to 0.080 inch (2.0 millimeters). In some examples the abradable may be advantageous at layer thickness of as low as 0.015 inch (0.38 millimeter) or as thick as 0.300 inch (7.6 millimeters). This depends primarily on the size of the engine.

A further variation involves a first source comprising the ceramic and optionally a fugitive and the second source comprising the metal, solid lubricant, and optionally fugitive. The first source and second source together are used to spray the TBC; the second source alone is used to spray the abradable layer. There may be a graded transition as flow from the first source is decreased and/or the second source is increased. As mentioned above, this allows some of the porosity found in a TBC lacking the solid lubricant to be filled with the solid lubricant. Providing the graded transition or allowing the TBC to include the solid lubricant is not believed to have performance advantages but may have manufacturing economy advantages.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A blade outer airseal having:
    a body comprising:
        an inner diameter (ID) surface;
        an outer diameter (OD) surface;
        a leading end;
        a trailing end;
        a metallic substrate; and
        a coating system atop the substrate along at least a portion of the inner diameter surface,
    wherein:
        at least over a first area of the inner diameter surface, the coating system comprises an abradable layer comprising a metallic matrix and a solid lubricant;
        at 1200° F the metallic matrix has at least 98% by volume fcc and L12 phases combined with at least 10% L12; and
        the metallic matrix comprises, by weight:
            ≥35% copper;
            30.0-45.0% combined nickel, cobalt, and iron with combined iron and cobalt content at most one-third of the nickel content;
            2.0-8.0% aluminum; and
            5.0-15.0% chromium.

2. The blade outer airseal of claim 1 wherein the combined cobalt and iron contents of the metallic matrix are less than 5% by weight.

3. The blade outer airseal of claim 1 wherein the metallic matrix further comprises, by weight:
    no more than 5.0% combined of all other elements; and
    no more than 1.5% of any individual other element.

4. The blade outer airseal of claim 1 wherein the metallic matrix further comprises, by weight:
    no more than 0.5% combined of niobium, molybdenum, tantalum, tungsten, and rhenium.

5. The blade outer airseal of claim 1 wherein the metallic matrix further comprises, by weight:
    ≤1.0% hafnium;
    ≤1.0% silicon; and
    ≤1.0% yttrium.

6. The blade outer airseal of claim 1 wherein:
    over the first area of the inner diameter surface, the coating system comprises the abradable layer and a thermal barrier layer between the abradable layer and the substrate.

7. The blade outer airseal of claim 1 wherein:
    the abradable layer has a volume content of said solid lubricant of 5.0% to 80%.

8. The blade outer airseal of claim 1 wherein:
    the solid lubricant comprises HBN.

9. The blade outer airseal of claim 1 wherein:
    the abradable layer has a volume content of said metallic matrix of 20% to 50%.

10. The blade outer airseal of claim 1 wherein:
    the abradable layer has less than 20% porosity.

11. The blade outer airseal of claim 1 wherein one or more of:
    the coating system has a bondcoat between the abradable layer and the substrate; and
    the substrate is a nickel-based superalloy.

12. A method for manufacturing the blade outer airseal of claim 1, the method comprising:
    thermal spray of the abradable layer.

13. A method for using the blade outer airseal of claim 1, the method comprising:
    installing the blade outer airseal on a turbine engine; and
    running the turbine engine so that blade tips rub the abradable coating.

14. A blade outer airseal having:
    a body comprising:
        an inner diameter (ID) surface;
        an outer diameter (OD) surface;
        a leading end;
        a trailing end;
        a metallic substrate; and
        a coating system atop the substrate along at least a portion of the inner diameter surface,
    wherein:
        at least over a first area of the inner diameter surface, the coating system comprises an abradable layer comprising a metallic matrix and a solid lubricant; and
        at 1200° F the metallic matrix has by volume:
            at least 88% fcc phase; and
            1% to 10% bcc (A2) phase; and
        the metallic matrix comprises, by weight:
            ≥80% copper;
            ≤10.0% nickel;
            3.0-9.5% aluminum; and
            3.0-10.0% chromium.

15. The blade outer airseal of claim 14 wherein the metallic matrix further comprises, by weight:
    no more than 5.0% combined of all other elements; and
    no more than 1.5% of any individual other element.

16. The blade outer airseal of claim 14 wherein the metallic matrix further comprises, by weight:
    no more than 0.5% combined of niobium, molybdenum, tantalum, tungsten, and rhenium.

17. The blade outer airseal of claim 14 wherein the metallic matrix further comprises, by weight:
    ≤1.0% hafnium;
    ≤1.0% silicon; and
    ≤1.0% yttrium.

18. A blade outer airseal having:
    a body comprising:
        an inner diameter (ID) surface;
        an outer diameter (OD) surface;
        a leading end;
        a trailing end;
        a metallic substrate; and
        a coating system atop the substrate along at least a portion of the inner diameter surface,
    wherein:
        at least over a first area of the inner diameter surface, the coating system comprises an abradable layer comprising a metallic matrix and a solid lubricant; and
        at 1200° F. the metallic matrix has:
            at least 40% by volume primary fcc;
            at least 10% by volume gamma prime (L12), bcc (A2), and/or secondary fcc (A1) crystal structure; and
            at most 10% by volume beta (B2) crystal structure.

19. the blade outer airseal of claim 18 wherein the metallic matrix comprises, by weight:
    ≥35% copper;
    30.0-45.0% combined nickel, cobalt, and iron with combined iron and cobalt content at most one-third of the nickel content;

2.0-8.0% aluminum; and
5.0-15.0% chromium.

20. the blade outer airseal of claim 18 wherein the metallic matrix comprises, by weight:
≥80% copper;
≤10.0% nickel;
3.0-9.5% aluminum; and
3.0-10.0% chromium.

21. A gas turbine engine compressor section comprising:
a stage of blades having Ni-based substrates; and
the blade outer airseal of claim 18 wherein the inner diameter (ID) surface faces tips of the blades.

* * * * *